UNITED STATES PATENT OFFICE.

BYRON E. ELDRED, OF NEW YORK, N. Y., ASSIGNOR TO THE COMMERCIAL RESEARCH COMPANY, OF NEW YORK, N. Y., A CORPORATION OF NEW YORK.

INCANDESCENT LAMP.

1,140,134.  Specification of Letters Patent.  Patented May 18, 1915.

No Drawing.  Application filed December 30, 1914. Serial No. 879,734.

*To all whom it may concern:*

Be it known that I, BYRON E. ELDRED, a citizen of the United States, residing at New York, county of New York, and State of New York, have invented certain new and useful Improvements in Incandescent Lamps, fully described and represented in the following specification.

The present application is in part a continuation of my application, Serial No. 477,281, filed February 11, 1909, and in part a continuation of my application, Serial No. 808,259, filed December 22, 1913, as a continuation of application Serial No. 656,987, filed October 26, 1911, and patented December 30, 1913, No. 1,083,070.

This invention relates to improvements in incandescent lamps or like devices having gas tight receptacles with leading-in wires sealed gas-tight through a vitreous wall.

In the manufacture of incandescent lamps, the leading-in wires are sealed in place by inserting them through an opening in the glass, then heating the glass until it is softened, usually by the employment of heat at about 900° C., and then squeezing the soft glass firmly into contact with the wires, as by the application of a clamp. In this way, the soft glass in maintained in contact with the wires until the glass sets to a hard condition from its soft or plastic state. This plastic state may persist, under certain conditions of strain or pressure, as low as 400° C., with the lamp glasses now generally used. As the glass and wires are finally brought to normal temperatures, a contraction of the glass and wires takes place. In use, such lamps are subjected to considerable changes of temperature, during which expansions and contractions of the glass wall and the leading-in wires take place. If a good seal between the wire and glass is not obtained in making the lamp, or if the seal fails during the use of the lamp owing to the expansions and contractions above referred to, the lamp is a total loss.

Platinum has heretofore been used as a leading-in wire, because it was the only metal combining various characteristics essential to success. Its coefficient of expansion was low as compared with most other metals. It had a high melting point and therefore would stand the heat of sealing-in. It had a non-oxidizable surface, so that glass would adhere to it and thereby produce a clinging union. Hence, if, as was generally the case, the lampglass had a coefficient of expansion slightly below that of the platinum, the union between the leading-in wire and the glass would be maintained during contraction, because of the elasticity of the glass which, on account of its clinging union with the wire, was put under a tensile strain. Furthermore, the platinum was a sufficiently good conductor of electricity for the purpose intended and hence could be used in a size small enough to permit sealing with the glass. There is some difficulty in making a seal where the leading-in wire is too large, because the total diametral expansion of the wire unduly strains the glass, unless the coefficients of expansion of the wire and glass are identical, which is very rarely the case. While other metals of the platinum group had characteristics similar to platinum, the latter was generally employed, because it is a most convenient one to obtain. Platinum, however, has a number of disadvantages for use as leading-in wires, probably the most important of which is the fixity or rigidity of its coefficient of expansion. That is to say, when platinum is to be used as a leading-in wire, the selection of the type of glass to be used is controlled by the coefficient of expansion of platinum. Hence, the lampmaker was confined in his selection of glasses to those having a coefficient of expansion as nearly as possible the same as that of platinum. A further disadvantage of platinum was that, owing to its coefficient of expansion being somewhat greater than that of the glass usually employed, it must be used only in relatively smaller sizes, as otherwise its absolute expansion will be greater than the elasticity of the glass can accommodate and leakage of air would result. Furthermore, although platinum will make a clinging union with glass, if the glass has a coefficient of expansion too much below that of the platinum, the clinging union will be broken during the cooling of the lamp and air permitted to leak around the wire. Also, platinum was relatively weak in the small sizes which it was necessary to use to obtain a good seal. This weakness of the small wire made its manipulation more difficult. Finally, platinum (or any of the metals of the platinum group) is expensive, it requiring great care in handling in order to avoid serious losses.

Many attempts have been made heretofore to produce a satisfactory substitute for platinum as a leading-in wire. It has not been possible to select from the elementary metals, other than those of the platinum group, a material suitable for leading-in wires, because either there is too wide a difference in the coefficients of expansion between the other metals and glass, or the electrical conductivity is very poor, or the melting point is too low. Where the difference between the coefficient of expansion of the metal and that of the glass is too great, a seal cannot be made or cannot be maintained between the glass and the wire, under the changes of temperature necessarily resulting. Where the conductivity is poor, a wire of larger diameter must be employed, thereby increasing the difficulties of making the seal. Metals of a low melting point obviously could not be used owing to the high temperature of the flame employed in sealing-in.

Attempts have been made to use an alloy wire of high melting metal with a coefficient of expansion the same as that of platinum, or of the usual lampglasses which are supposed to have substantially the same coefficient of expansion as platinum. These wires have not been successfully employed. One of the reasons for failure of such alloy wires is the difficulty of obtaining an alloy of a determined coefficient of expansion. That is to say, in the commercial manufacture of alloys of high melting metals, the coefficients are supposed to vary according to the proportions of the component metals in the alloy. In practice, however, there is a not unimportant variation, probably due to some unrecognized difference in the heat treatment during the manufacture of such wires. Furthermore, although a wire of this type can be made with an average coefficient of expansion (from normal to sealing-in temperatures) about equal to that of the glass with which it is to be used, such wires do not usually expand regularly through the said range of temperature and consequently, at some temperatures, when cooling down, the glass might be subjected to a strain sufficient to break its clinging union to the wire. That is to say, although the seal might be perfect at the setting temperature of the glass, and although at normal temperatures, the coefficients of expansion of the wire and glass would be so nearly alike as to maintain a satisfactory seal, if such existed at that temperature, yet at some intermediate temperature when cooling down to the normal the seal would be broken, because of the considerable difference in expansions, at that temperature, between the wire and glass. A further defect of such alloy wires was their ready oxidizability, thus tending to produce a coating of oxid on the wire during the sealing-in process, which oxid might be porous enough under some circumstances to permit the air to leak through. Attempts to overcome the disadvantages of such alloy wires have been made. It has been proposed, for example, to provide such an alloy wire with a suitable exterior coating, particularly with a film of platinum. Such wires, however, have not been found satisfactory, for the reason that, owing to the methods of manufacture and the inherent difficulty of uniting platinum to such core metals, leaks existed between the core and platinum coating. While such leaks may have been due to defective methods of manufacture, they were also the result of the use of a core alloy whose coefficient of expansion was too high, viz., either the same as platinum or the same as high expansion lampglasses, which were generally assumed to be about the same as platinum. Where the coefficient of expansion of the core is substantially the same as that of platinum, the core and sheath would expand and contract together and therefore there could be no pinching effect of the sheath on the core. Hence, unless the union between the platinum and core was perfect in every respect, a leak would be developed. A further objection to such composite wires was the poor conductivity of the wire as a whole. As the resistance of core alloys of the nature described is quite high, and as the platinum sheath itself has but a limited cross section, it was necessary to make sealing-in wires of this type of a larger diameter than a solid platinum wire, so that, as a result, the difficulties of obtaining a good seal between the wire and glass were aggravated.

Some attempts have also been made to produce a leading-in wire in which the alloy core was coated with a sheath consisting of platinum alloyed with other metals. These attempts have not been satisfactory, principally for the reason that the alloy core was of such a nature that its coefficient of expansion was the same as or higher than glass, and generally the same as platinum, while the alloy sheath had a coefficient of expansion above that of the glass and also above platinum, owing to the high coefficient of expansion of the material alloyed with the platinum. Consequently, the coefficient of expansion of the composite wire was altogether too high relative to the glass with which it was to be used. In some cases, the methods of manufacture of such composite wires provided with an alloyed platinum coating was such as to produce a coating of irregular thickness, so that the coefficient of expansion of a section of wire taken from one part would be different from another section taken from the same wire. This introduced an uncontrollable variability resulting in the production of many imperfect lamps. A further objection was that generally the core was not properly coated at certain points and this exposed core would oxidize rapidly in the completed lamp, thus leaving passages of porous material through which the air could leak into the lamp.

The purpose of the present invention is to overcome all of the disadvantages hereinbefore referred to. This is done by providing a wire which is highly conductive and therefore may be used in sizes of relatively small cross section, thus reducing the difficulties of making a good seal with the glass. The wire is strong, because it is provided with a strong core and therefore will satisfactorily stand the manipulation necessary in using it. An important and probably the basic advantage is the fact that it can be made to have any required coefficient of expansion needed in the lamp business, thus permitting the use of any selected type of lamp-glass. In this way, the lamp manufacturer is at liberty to select a type of glass advantageous for various properties other than its particular coefficient of expansion.

A most important additional advantage of applicant's invention is that the expansion of the wire is reasonably regular, between the normal temperature and the temperature at which the glass sets from its plastic state. With a wire whose rate of expansion varies considerably from that of glass at any temperature between the setting temperature of the glass and normal, there is always the danger that the wire will contract so much more than the glass as to pull loose therefrom and thus leave an opening around the wire through which the air can leak. This opening may not be closed satisfactorily by subsequent cooling down of the lamp and wire. For this reason, it is important to have a wire whose rate of expansion from the sealing-in temperature to normal is reasonably regular and therefore approximate to the rate of expansion of the glass through the same range of temperature. The alloy or other core material which it is necessary to employ in producing a leading-in wire, has a rate of expansion which departs considerably from that of glass, at temperatures intermediate the normal and the setting temperature of the glass; but the completed wire of the present invention overcomes this difficulty and corrects this variable rate of expansion by the particular sheath employed, as will be more fully explained hereinafter.

With the above objects in view, the invention comprises an air-tight receptacle, having a wall of vitreous material into which is sealed a leading-in wire having a nickel-iron alloy core whose coefficient of expansion is materially less than that of the glass with which it is to be used, this core carrying a sheath of high-melting, high-conductive material, whose coefficient of expansion is considerably above that of such glass, the sheath and core being so firmly united that the composite wire will have a coefficient of expansion longitudinally and transversely, which is a resultant of the coefficients of expansion of the core and sheath respectively.

The core and sheath above defined embody the invention in its preferred and most advantageous form, but the invention includes, also, leading-in wires formed of other materials and embodying features of the invention, as defined by the claims.

The coefficients of expansion longitudinally and transversely need not be the same, but they should not be either too much above nor too much below the glass with which the wire is to be used. If either coefficient of expansion is too much above that of the glass with which the wire is to be used, the wire during the cooling of the lamp will contract so much more rapidly than the glass that it will break loose from the glass and will leave openings through which air can pass to the receptacle. On the other hand, if the coefficient of expansion of the composite wire should be too much below the glass with which it is to be used, the glass will shrink so strongly against the wire that, for this reason, the glass may be cracked or broken.

When the transverse coefficient of expansion of the composite wire is greater than that of the glass, a clinging union between the wire and glass is necessary in order that leakage may be avoided. This results in a tensile strain in the glass around the wire. If this tensile strain should be too great owing to too great a contraction of the wire, the clinging union between the wire and glass is broken.

When the transverse coefficient of expansion of the composite wire is about the same as that of the glass with which it is to be used, a clinging union is necessary, but, as there is little or no tensile strain on the glass, this union need not be very strong. When the transverse coefficient of expansion of the composite wire is less than that of the glass with which it is to be used, the glass contracts more rapidly than the wire and hence tightly pinches the wire, so that a compressive strain in the glass around the wire is obtained. In this case, although a clinging union between the glass and wire is not imperative, it is no disadvantage.

It will be clear from the above that where the conductive exterior sheath of the composite wire is of a non-oxidizable material, it can readily be sealed into glass and a satisfactory seal obtained and maintained, even though the coefficient of expansion of the wire is somewhat above or is equal to or is somewhat below that of said glass. Where, however, the exterior conductive sheath is of material which would oxidize under ordinary conditions of sealing-in, a clinging union between the wire and glass may not result, under ordinary operations, because of the formation of a layer of oxid on the outer surface of the wire. However, this difficulty may be overcome by many well-known devices or methods whereby the existence of a stratum of oxid between the wire and the glass in the finished lamp will be avoided. For example, fluxes may be used when sealing-in, or the sealing operation may be carried out under non-oxidizing conditions, as for example, in an atmosphere of some inert or non-oxidizing gas, such as hydrogen, nitrogen, or steam, the latter being particularly convenient when a copper surfaced wire is used, as copper does not oxidize when heated in an atmosphere of steam.

Many methods may be employed in making the wire. For example, the sheath of high-conductive, high-melting material may be united integrally to the nickel-iron core by a weld union produced in accordance with the process described in the United States patent to Monnot No. 853,716.

While an integral union between the sheath and the core is highly advantageous and results in a wire of great reliability, the invention is not to be limited to a wire made in that way. It is an important feature of the present invention that a satisfactory wire can be produced even where the union between the sheath and core is not of such a nature as to be termed integral. The reason why the weld union is not an absolute necessity is because, by making the core material so that its average coefficient of expansion from the normal to the sealing-in temperature is distinctly less than the corresponding coefficient of the glass with which it is to be used, while the corresponding coefficient of expansion of the sheath metal is distinctly above that of said glass, the sheath metal will contract strongly against the core so that the usual union formed by soldering, hammering, hot swaging, or other well-known process, will be sufficient to prevent any leakage between the core and sheath.

In making the wire, it is very advantageous to combine the core and sheath in billet form and then roll and draw or otherwise work the billet down to wire of the desired size, because of the ease of inspection, measurement of constants, and manipulation in working with a large body such as a billet.

It is particularly to be noted that with the present invention the coefficient of expansion of the glass from which the lamp is to be made is the controlling factor. The type of glass to be used having first been selected and its average coefficient of expansion from about zero degree centigrade or normal temperature to the temperature at which the glass softens under heat being ascertained, the constants of the wire may then be determined.

The proportions of nickel and iron in the core metal are intended to determine the coefficient of expansion of the core. In practice, it is difficult to obtain commercially a core material of a uniform, predetermined coefficient of expansion. It is supposed that this lack of uniformity in nickel-iron alloy is due to accidental uncontrollable variations in the heat treatment when uniting the constituent metals of the alloy. Since, therefore, billets of nickel-iron alloy, of a uniform coefficient of expansion, cannot be obtained conveniently on the market, it is an important feature of the present invention that, not withstanding the variations from the desired standard in the core metal, a wire having a substantially uniform coefficient of expansion may be produced by the use of a sheath of the proper thickness, as will be hereinafter more fully explained. A further peculiarity in the expansion of the core metal is that, if the expansions through the necessary range of temperature be platted, the curve of such expansions will at some temperatures depart materially from the average coefficient of expansion from zero to the sealing-in temperature at which the glass sets. Hence, it may be said that in general practice, the usual predetermination of proportions of nickel and iron will result only in a fair approximation to the predetermined coefficient of expansion of the core, the variations usually being sufficient to be disadvantageous in practice. By the present invention, this disadvantage may be overcome because the proportion of sheath metal to the core, that is to say, the thickness of the sheath may be readily varied to determine the resultant average coefficient of the finished wire. Hence, a core billet of the required composition may be provided with a sheath metal of high-conductive, high-melting material, having a thickness such that the compound billet will give the required average coefficient of expansion. In practice, the thickness of the sheath metal as first applied may be greater than is necessary. The billet may then be tested as to its coefficient of expansion and the surplus metal of the sheath turned off to the required diameter to give the resultant average coefficient of expansion which is required. The billet may then be worked down to wire of the desired size. It will be seen that a great advantage of the invention is that the coefficient of expansion may be controlled in a reliable manner during the manufacture by varying the thickness of the sheath. Furthermore, since sheath metal of the kind necessary in carrying out the invention has a rate of expansion which is fairly uniform and may be considered as rectilinear, the sheath metal tends to straighten out the curve of expansion of the core metal and thus produces a composite wire whose curve of expansion does not depart to an injurious extent from the average coefficient of expansion required in the wire. It is partly for this reason that a composite wire made in accordance with this invention satisfactorily maintains a seal at all temperatures to which the lamp will be subjected in manufacture and in use.

While the proportions of the constituent metals in the nickel-iron core may be varied to a considerable extent, and the proportion in thickness of the sheath metal to the diameter of the core may also be varied as desired, it is important that in every case the coefficient of expansion of the core shall be distinctly less than that of the glass with which the wire is to be used, in order that the sheath metal will always contract sufficiently onto the core to maintain a reliable union between the sheath and core.

A few specific examples illustrative of the invention will now be given.

Assuming that the type of lampglass selected has an average coefficient of expansion of about 89 or $90 \times 10^{-7}$ and that the completed leading-in wire is to have about the same coefficient, a nickel-iron core metal may be selected having a composition of about 38% to 45% nickel. The average coefficient of expansion of this core would be approximately from $42 \times 10^{-7}$ to $77 \times 10^{-7}$. Such a core may then be provided with a sheath of suitable high-melting, high-conductive material, such, for example, as silver, copper or gold, which sheath may be applied to the core in any of the well-known ways. When the core has an average coefficient of expansion of about $42 \times 10^{-7}$, as before suggested, the sheath, if of silver, would be about 65% of the weight of the entire billet; if of copper, the sheath would be about 60%; and if of gold, about 75%. The composite billet may be tested to determine its average coefficient of expansion, which should be about that, or not much greater than that, of the glass with which it is to be used. If it be found that the average coefficient of expansion of the billet is too great, the composite billet may be put in a lathe and some of the sheath metal turned off, after which a further test of the coefficient may be made. If the coefficient is too low, a heavier sheath may be supplied to the core. The proper constants of the billet having been obtained, the billet is then worked down to wire of the desired size, and usually to about .006 inches to .015 inches in diameter, according to the size of lamp with which it is to be used. It will be obvious from a consideration of the above example that a certain amount of accuracy is required in making such wire, in order that its coefficient of expansion shall not at any time be too greatly above that of the glass. It should not be more than 105% that of the glass with which it is used. Since it is difficult to avoid some variations in different lots of glass, it is obvious that in the use of a wire whose coefficient is intended to be the same as the glass or to be within certain limits above the glass with which it is to be used, there is room for mistakes which may result in failures of some lamps, unless careful supervision of the work is maintained at all times. Hence, when such supervision is undesirable, a leading-in wire whose coefficient of expansion is less than that of platinum is safer in practice, and further advantage is obtained by having its average coefficient of expansion less than that of the glass with which it is used.

As an example of a lamp provided with a leading-in wire whose average coefficient of expansion from normal temperatures to the temperature at which the glass sets to the solid state from its softened condition is less than the glass, the following is submitted as illustrative: With glass having an average coefficient of expansion of, say, $89 \times 10^{-7}$ from common temperatures up to 300° C. (which would probably average about $93 \times 10^{-7}$ up to the softening point of the glass), the leading-in wire may have an average coefficient of expansion lying between $60 \times 10^{-7}$ and $75 \times 10^{-7}$ for temperatures up to 300° C. With a leading-in wire of this description, the pressure between the wire and glass in the completed lamp is sufficient to insure a tight joint and at the same time is not so great as to cause cracks in the stem of the lamp. In making such a wire, the core of nickel-iron alloy may contain about 38% nickel. Such a core material will have an average coefficient of expansion up to 100° C. of about $25 \times 10^{-7}$. Up to 300° C., its average will be about $42 \times 10^{-7}$; and at the sealing-in temperature, its average coefficient of expansion will be about $65 \times 10^{-7}$. A billet of this alloy may be provided, by any suitable method, with an outer layer or sheath of copper. This layer may then be turned down in a lathe to the exact thickness required to give the desired resultant coefficient of expansion, which may be determined by test of the composite billet. The billet may then be drawn or swaged, or otherwise worked, into wire and annealed.

In ordinary practice, the core rod of nickel-iron alloy may be 0.892 inches in diameter, and after the copper sheath is attached thereto, the composite billet may be turned down to a cylinder of 1 inch diameter. The wire may be drawn down to a diameter of from .006 to .015 inch.

It is to be understood that the above examples are merely illustrative of the invention, and that it is not to be limited to the said specific examples.

By the terms "high-conductive" and "high electrical conductivity" used in this specification and the claims I mean high-conductive or high-electrical conductivity relatively to platinum, referring, for instance, to such metals as copper, silver, gold, and their alloys having an electrical conductivity that is high as compared with platinum.

What is claimed is:—

1. The combination, with a gas-tight receptacle having a wall of vitreous material, of a composite leading-in wire sealed therein, said wire comprising a core of metallic material having a coefficient of expansion whose average from the setting temperature of the glass down to normal is less than that of the glass through the same range of temperatures, said wire having an external metallic sheath consisting of metal of high electrical conductivity, said sheath having a coefficient of expansion whose average for the said temperature range is greater than that of said glass, the said sheath being united to the core to give a resultant average coefficient of expansion of the wire for the said temperature range such that a union may be made and maintained between said sheath and the glass.

2. The combination, with a gas-tight receptacle having a wall of vitreous material, of a composite leading-in wire sealed therein, said wire comprising a core of an alloy of nickel and iron in such proportions as to give the core an average coefficient of expansion, from the setting temperature of the glass down to normal temperature, which is less than that of the glass for the same range of temperature, said wire having an external copper sheath united to the core and of such thickness as to give to the complete wire a resultant average coefficient of expansion over the said range, intermediate those of the copper and the particular alloy.

3. The combination, with a gas-tight receptacle having a wall of vitreous material, of a composite leading-in wire sealed therein, said wire comprising a core of nickel-steel having a rate of expansion less than that of the glass and an external copper sheath welded thereto and forming the surface of the wire.

4. The combination, with a gas-tight receptacle having a wall of vitreous material, of a composite leading-in wire sealed therein, said wire comprising a core of nickel-steel having a rate of expansion less than that of the glass and an external sheath consisting of metal of the copper class welded thereto and forming the surface of the wire.

5. The combination, with a gas-tight receptacle having a wall of vitreous material, of a composite leading-in wire sealed therein, said wire having a surface of copper and a core having a rate of expansion less than that of the glass.

6. The combination, with a gas-tight receptacle having a wall of vitreous material, of a composite leading-in wire sealed therein, said wire having a surface of high melting base metal and a core having a rate of expansion less than that of the glass.

7. The combination, with a gas-tight receptacle having a wall of vitreous material, of a composite leading-in wire sealed therein, said wire having a surface of metal of the copper class and a core having a rate of expansion less than that of the glass.

8. The combination, with a gas-tight receptacle having a wall of vitreous material, of a composite leading-in wire sealed therein, said wire consisting of a two-layer composite wire, one such layer being of nickel-steel having a rate of expansion less than that of the glass, and the other layer of high-expansion high melting metal.

9. The combination, with a gas-tight receptacle having a wall of vitreous material, of a composite leading-in wire sealed therein, said wire consisting of reinforced copper wire, said reinforcement consisting of a layer of low-expansion nickel-iron alloy.

10. The combination, with a gas-tight receptacle having a wall of vitreous material, of a composite leading-in wire sealed therein, said wire being composed of a layer of copper and another layer of low-expansion nickel-steel in sufficient amount to reduce the total expansion of the composite wire sufficiently to secure a seal with the glass.

11. The combination, with a gas-tight receptacle having a wall of vitreous material, of a composite leading-in wire sealed therein, said wire consisting of a shell of metal of high electrical conductivity having its expansion restrained to a point not greater than that of the glass with which it is used, by a core of nickel-steel whose coefficient of expansion is sufficiently less than that of said glass to give a resultant average coefficient of expansion of the wire not greater than that of said glass.

12. The combination, with a gas-tight receptacle having a wall of vitreous material, of a composite leading-in wire sealed therein, said wire having a surface sheath of high melting base metal and a core of metallic material, the thermal expansion of the core and sheath being different and so proportioned as to produce a resultant expansion of the composite wire such as to secure a seal with the glass.

13. The combination, with a gas-tight receptacle having a wall of vitreous material, of a composite leading-in wire sealed therein, said wire having a surface sheath of copper and a core of metallic material, the thermal expansion of the core and sheath being different and so proportioned as to produce a resultant expansion of the composite wire such as to secure a seal with the glass.

In testimony whereof, I have hereunto set my hand, in the presence of two subscribing witnesses.

BYRON E. ELDRED.

Witnesses:
A. WHITE,
M. C. MASSIE.